July 7, 1964

T. W. MERRITT ETAL 3,139,857

MILK FILTERING ARRANGEMENT

Filed Jan. 8, 1963

INVENTORS.
Thomas W. Merritt
Chester A. Thomas
BY
Hofgren, Brady, Wegner, Allen & Stellman
Attorneys

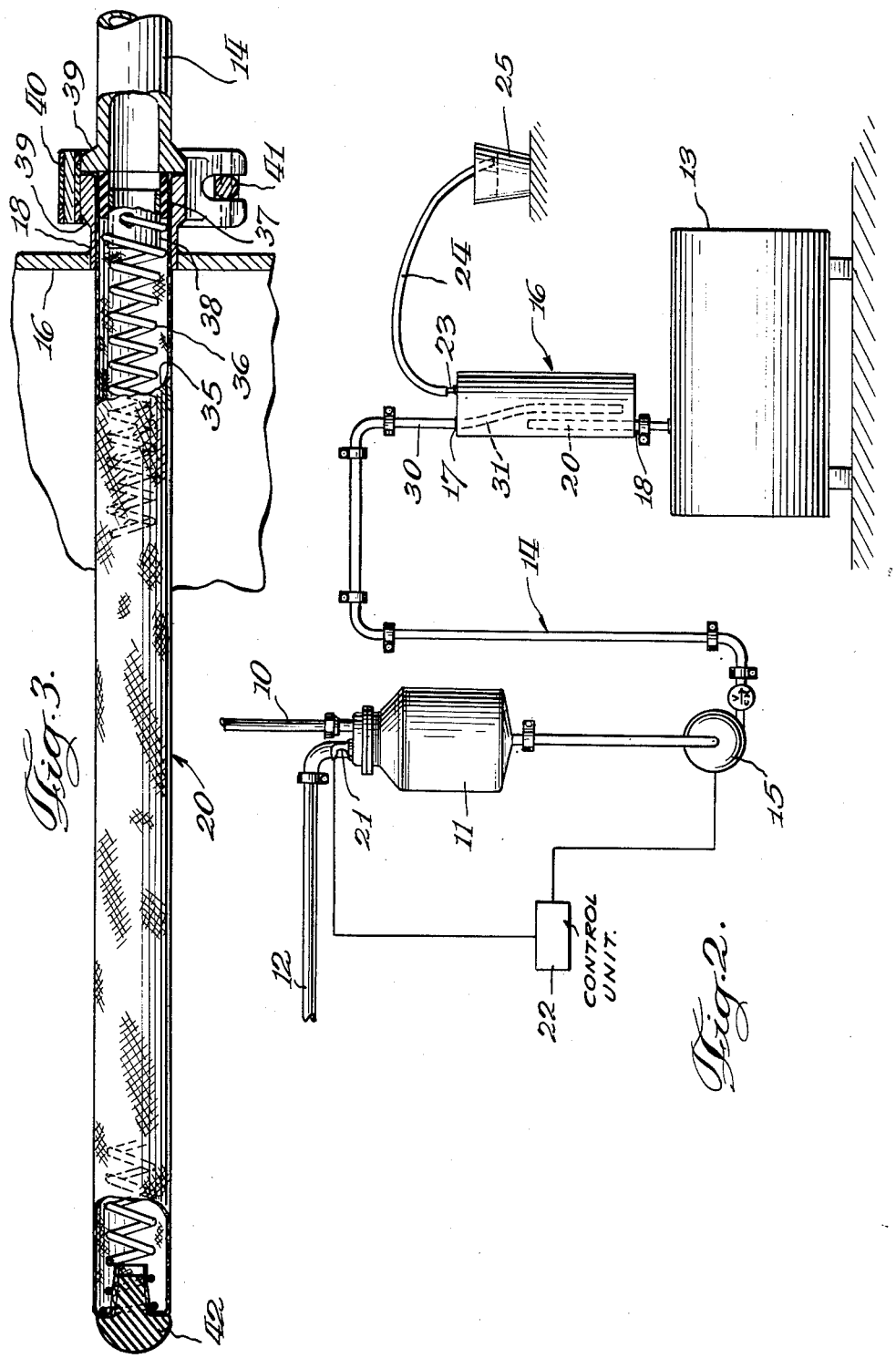

July 7, 1964
T. W. MERRITT ETAL
3,139,857
MILK FILTERING ARRANGEMENT
Filed Jan. 8, 1963
3 Sheets-Sheet 3
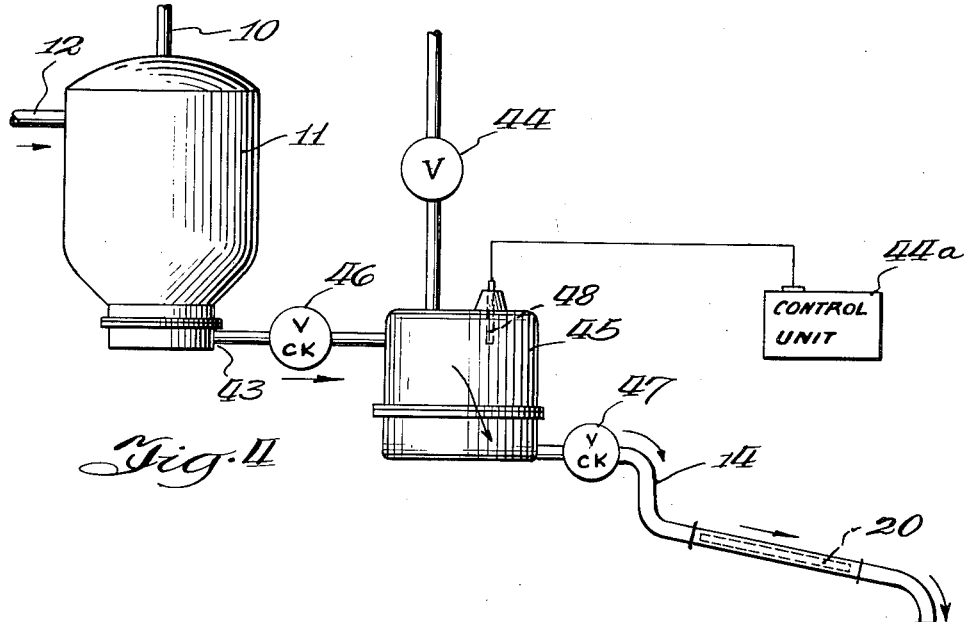
Fig. 4
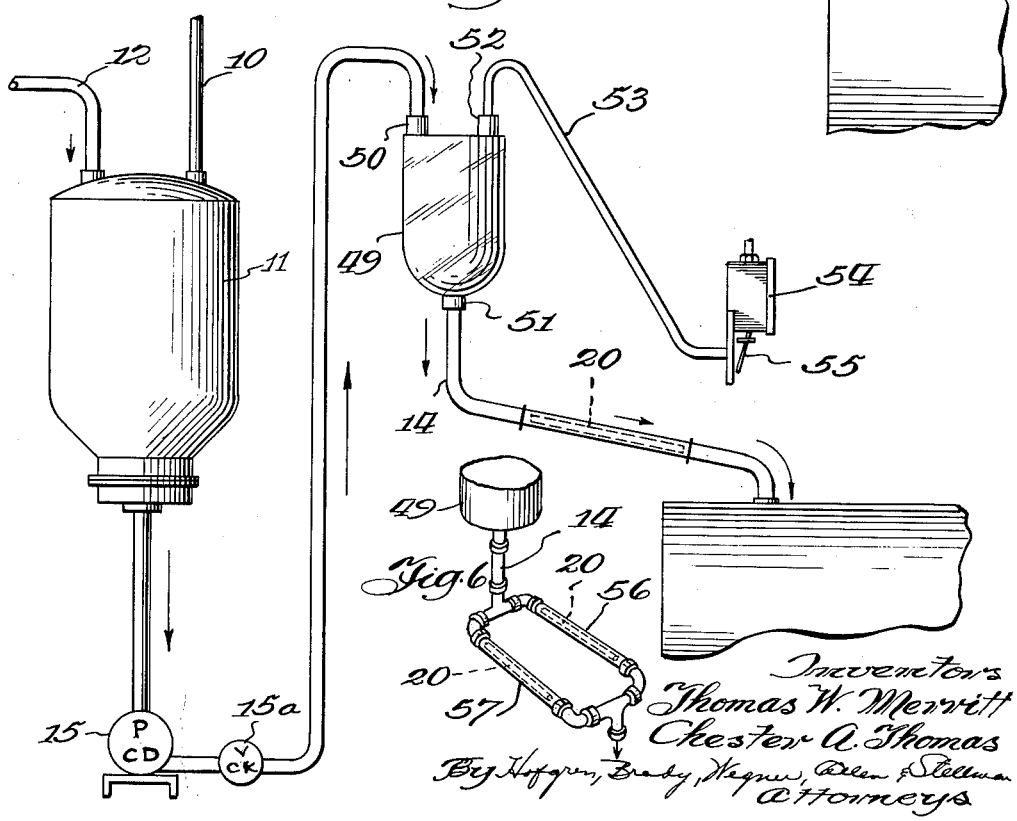
Fig. 5
Fig. 6
Inventors
Thomas W. Merritt
Chester A. Thomas
By Hofgren, Brady, Wegner, Allen & Stellman
Attorneys

United States Patent Office 3,139,857
Patented July 7, 1964

3,139,857
MILK FILTERING ARRANGEMENT
Thomas W. Merritt, St. Charles, and Chester A. Thomas, Oak Park, Ill., assignors to Babson Bros. Co., a corporation of Illinois
Filed Jan. 8, 1963, Ser. No. 250,467
13 Claims. (Cl. 119—14.46)

This application is a continuation in part of application Serial Number 72,941, filed December 1, 1960, and relates to milk handling systems, and more particularly to a milk filtering arrangement for a carry-away milking system.

Carry-away milking systems have become increasingly popular with operators of modern dairy farms, at least in part because of the reduction in manpower effected through their use, the improved sanitary conditions, and the convenience they afford. In a typical carry-away milking system, milk is drawn from individual milkers through an evacuated milk line and into an evacuated container, or receiver, by vacuum applied to the milk receiver. In many installations, the milk is intermittently transferred in batches from the milk receiver to a suitable delivery point, as storage or other handling means, such as a milk bulk tank, by a milk pump or releaser connected between the milk receiver and the milk bulk tank.

For filtering the milk passing through the carry-away milking system, it has been customary to provide a milk filter in each milker. It has been found that milk filters in any portion of the evacuated system are likely to become clogged, thereby reducing the vacuum at the milking apparatus and reducing milking efficiency. Alternatively, a milk filter between the intermittently operating milk pump and the milk bulk tank must absorb at least part of the impact of the milk each time the pump is started.

It is a primary object of this invention to provide an improved milk filtering arrangement and method for carry-away milking systems.

A feature of the invention is the provision in a milk handling system of a milk filtering arrangement in which batches of milk are intermittently delivered to a milk reservoir, and the milk is filtered through a milk filter connected with an outlet in the reservoir.

Another feature of the invention is the provision in a carry-away milking system having an evacuated milk line and milk storage means, of a filtering arrangement in which the evacuated milk line is connected with milk receiving means from which the milk is transferred to a milk reservoir by an intermittently operating means, with the milk passing from the milk reservoir to the milk storage means through a milk filter connected with an outlet in the milk reservoir.

A further feature of the invention is the provision in a milk handling system of a method of filtering milk including intermittently transferring batches of milk to a reservoir thereby forming a body of milk, and continuously filtering the body of milk as it passes out of the reservoir.

Additional features and advantages of the invention will be apparent from the following description and drawings, in which:

FIGURE 2 is a diagrammatic elevational view, similar to FIGURE 1, but with the reservoir and milk filter vertically disposed;

FIGURE 3 is a side view of the milk filter installed in a reservoir, with parts broken away to illustrate the construction;

FIGURE 4 is a diagrammatic elevational view of a portion of an evacuated carry-away milking system incorporating an embodiment of the invention in a milk transfer means having a releaser chamber;

FIGURE 5 is a diagrammatic elevational view of a further modification of the invention having an overflow signal; and FIGURE 6 is a perspective view of a multiple filter installation.

Figure 1:
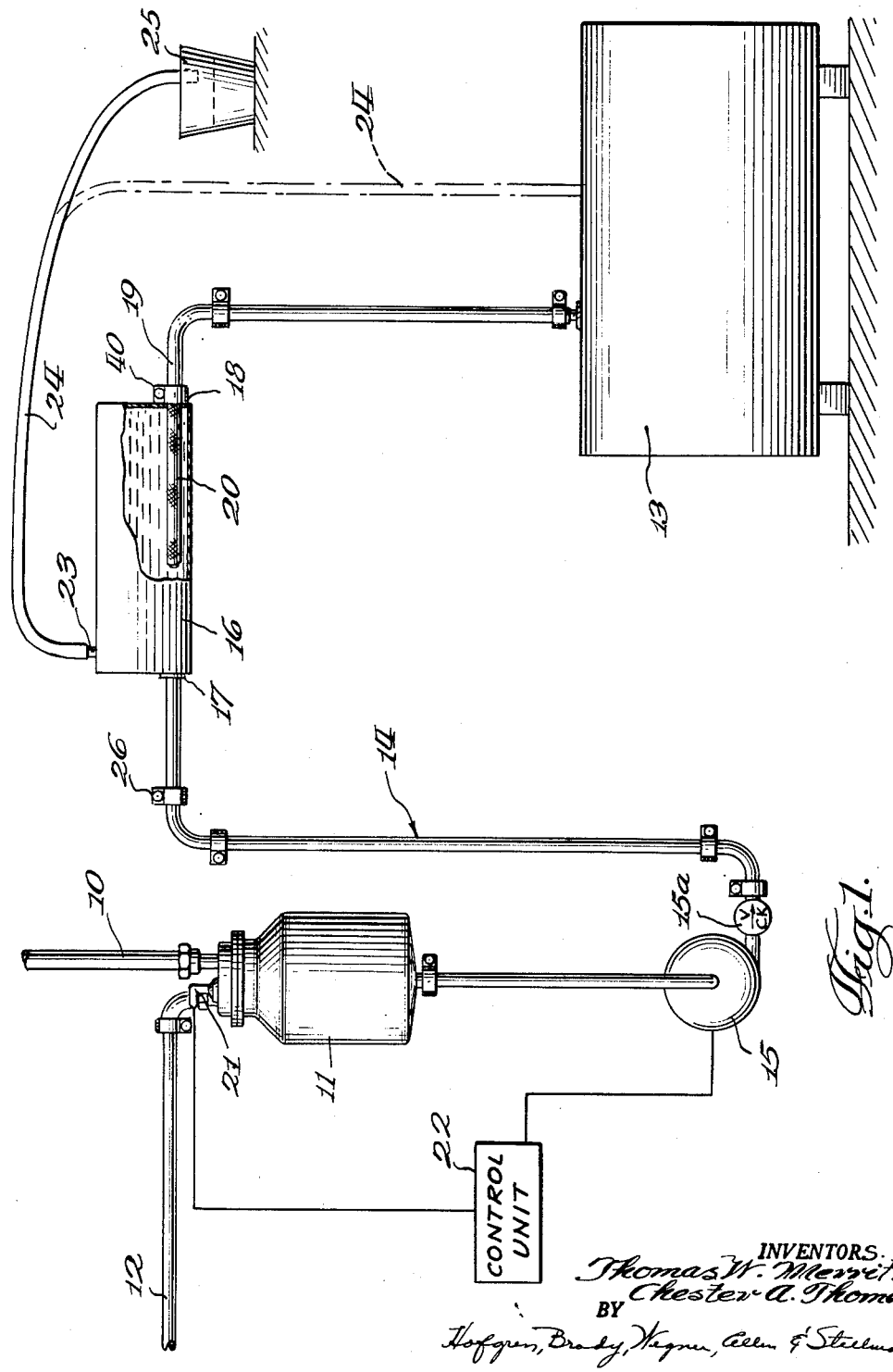
FIGURE 1 is a diagrammatic elevational view of a portion of an evacuated carry-away milking system incorporating an embodiment of the filtering arrangement having a horizontally disposed reservoir and milk filter.

The invention is directed to a milk filtering arrangement for an evacuated carry-away milking system in which milk flows, as by vacuum, to a milk receiver from which batches of milk are intermittently transferred to a milk reservoir, with the milk in the reservoir passing through a milk filter connected with the outlet of the reservoir and into a suitable storage means, such as a milk bulk tank.

Referring to the drawings, in FIGURE 1 a vacuum conduit 10 is connected between a source of vacuum (not shown) and milk receiving means, such as a suitable milk receiver 11, for drawing milk from suitable milkers (not shown) through an evacuated milk line 12 and into the milk receiver. Milk in the milk receiver 11 is transferred to milk storage means, in the form of a milk bulk tank 13, which is usually at or near atmospheric pressure, through conduit means 14. More particularly, intermittently operable means, in the form of a suitable milk pump 15 having its inlet connected with the milk receiver and its outlet connected with a milk reservoir 16, is provided for intermittently delivering batches of milk from the milk receiver to the milk reservoir. The outlet of milk pump 15 is provided with a suitable check valve 15a to prevent reverse flow of milk when the pump is inoperative. The milk reservoir 16, which will be more fully described hereinafter, has an inlet 17 and an outlet 18 connected in a horizontal pipe line portion 19 of the conduit means 14. The reservoir outlet 18 is connected with the outlet of a milk filter 20 which has an elongated inlet portion horizontally disposed in the bottom of the milk reservoir 16. The reservoir outlet 18 communicates in a suitable manner with the milk bulk tank 13 which is at a lower elevation than the milk reservoir 16.

A high capacity milk pump is necessary to overcome the vacuum in the evacuated milk receiver 11, and the intermittent operation is preferred to run the pump only when milk is present to be moved. For example, in a typical installation under normal operating conditions, the pump may operate three times a minute for periods of a few seconds and delivers several gallons of milk in each operation.

The milk pump is started responsive to the presence of a predetermined level of milk in the milk receiver 11. More particularly, an electric probe assembly 21 has a probe extending into the top of the milk receiver, and the probe is responsive to the presence of the predetermined level of milk in the milk receiver 11 thereby providing sensing means for closing an electric control circuit to a control unit 22. Responsive to closing of the control circuit, an electric circuit is closed in the control unit 22, for actuating the electric milk pump 15. A timer device in the control unit maintains the milk pump circuit closed for a predetermined period of time sufficient for the milk pump 15 to remove a suitable quantity of milk from the milk receiver 11. A batch of milk is removed from the milk receiver during one operating cycle of the milk pump 15 and is pumped to the milk reservoir 16, forming a body of milk in the reservoir.

The milk reservoir 16 may be in the form of a closed tank having a capacity sufficient to receive at least a full batch of milk as delivered by the pump, as three or four gallons, depending on the capacity of the particular milking installation. The closed tank is provided with a connection 23 keeping the tank in open communication with atmosphere, and which may also be connected with a conduit 24 for transferring any overflow milk to a suitable container, such as a bucket 25. Alternatively, the conduit 24 may open into the milk bulk tank 13, as indicated in broken lines, as the tank 13 is open to atmosphere. Milk is thus at atmospheric pressure at all times in the milk reservoir 16, so that there is no resistance to flow during pumping periods, and so that milk continuously flows by gravity through the milk filter 20 and into the milk bulk tank 13. The reservoir 16 holds the milk as it is delivered by pump 15 and neither a pressure on the filter nor back pressure affecting pump operation is built up. In washing the carry-away milking system, the tank may be inverted after loosening pipe clamps 26 and 40, and drained through the overflow connection 23.

While we prefer a tank open to atmosphere, the reservoir 16 may be in the form of a larger capacity closed tank without an overflow connection, and a batch of milk delivered by the milk pump will then be cushioned by a pocket of air entrapped in the closed tank. The entrapped air will provide a slightly greater head pressure to urge the milk through the milk filter 20. The reservoir 16 may also take the form of an open top tank having suitable capacity to assure against overflow of the milk, or a suitable overflow connection may be provided.

Referring to FIGURE 2, the carry-away milking system is substantially the same as in FIGURE 1, but milk reservoir 16 is positioned in a vertical pipe line portion 30 of the conduit means 14. The reservoir inlet 17 may be provided with a lead-in pipe 31 extending to near the bottom of the tank, minimizing splashing and aeration of inflowing milk. For washing the milking system, the reservoir outlet connection 18 is disconnected by removing clamp 40, and the milk filter 20 is removed.

The relationship of milk filter 20 and reservoir 16 is shown in FIGURE 3. The milk filter 20 includes a suitable filter sock 35, usually of fabric or paper. The filter sock 35 encases and is supported by an elongated spiral spring 36 fixed to a tubular resilient flanged fitting 37 by a metal sleeve 38. The filter sock 35 encases the side of the resilient fitting 37, and the entire assembly is inserted through the reservoir outlet connection 18 with the filter sock tightly held in a fluid-tight manner between the outside of the resilient fitting 37 and the inside of the reservoir outlet 18. An end of the conduit means 14 abuts the flange on the resilient fitting 37, and this end, and the reservoir outlet connection 18, have beveled outwardly extending shoulders 39 which cooperate with mating portions of a split clamping ring 40 to form a fluid-tight joint when the clamping ring is tightened against the shoulders 39 by means of a clamping screw 41. The free end of the filter sock 35 may be sealed in any suitable manner as by a plug 42, by sewing, or by an adhesive joint.

FIGURE 4 shows an embodiment of the present invention utilizing a milk releaser means in the carry-away milking system. A milk receiver 11 is connected through a conduit 10 with a source of vacuum (not shown), the vacuum drawing milk through evacuated milk line 12 into milk receiver 11. Outlet 43 at the bottom of the milk receiver 11 is connected through check valve 46 with the releasing chamber 45. Valve 44 controls the application of vacuum to releasing chamber 45, and is actuated by control unit 44a. Chamber 45 is connected through check valve 47 with conduit means 14 having a filter 20 disposed therein and through which the released milk flows to an unevacuated storage tank 13.

During operation of the system, milk flows through pipe line 12 into receiving chamber 11 where it collects. While valve 44 is open, its unenergized position, vacuum is likewise applied to releasing chamber 45 and milk flows through check valve 46 from receiving chamber into the releasing chamber. Check valve 47, in the outlet of the release chamber, is closed. When the level of milk within chamber 45 reaches the bottom of electrode 48, the release cycle is initiated, and air is admitted through valve 44 to chamber 45. Valve 46 closes, as a result of the evacuated condition of receiving chamber 11, and the milk in the releaser chamber flows out through check valve 47 and into conduit 14. After a period of time, valve 44 opens and the cycle is repeated so long as milk remains to be released.

The filter 20 is in a substantially horizontal portion of conduit 14, but said conduit is inclined enough to allow the milk to flow through the filter by gravity and to prevent milk from standing in the conduit. The conduit 14, which acts as a reservoir, is sufficiently large to accumulate milk before it passes through filter 20 to prevent a backup in the milk releaser chamber 45 during normal operation.

FIGURE 5 shows another modification of the carry-away milking system which has a milk pump 15 to transfer milk intermittently to a milk reservoir 49 connected with conduit 14 between said milk pump and a milk filter 20. Reservoir 49 has an inlet 50 and an outlet 51. Reservoir 49 has an overflow outlet 52 connected through conduit 53 to an overflow signal device 54, which is activated by a stream of milk striking and moving activator paddle 55. The signal device may be wired to a buzzer or a light to attract attention of an operator, or it may be wired to a control unit which automatically turns off the vacuum pump (not shown) and the milk pump 15.

FIGURE 6 shows means for increasing the filtering capacity of the carry away milking system by utilizing a multiple filter installation. Conduit 14 is separated into branches 56 and 57, each having a filter 20 therein. While the drawing shows the use of a double branch and filter arrangement, it is understood that any number of branches and filters could be used, depending on the capacity of the system.

While I have shown and described certain embodiments of my invention, it is to be understood that it is capable of many modifications. Changes, therefore, in the construction and arrangement may be made without departing from the spirit and scope of the invention as disclosed in the appended claims.

We claim:

1. A milk handling system comprising: evacuated milk receiving means; a milk line connected with said receiving means for delivering milk from milkers to said receiving means; a milk reservoir having an inlet and an outlet; a conduit connected between said receiving means and the inlet of said reservoir; intermittent milk transfer means connected with said conduit for transferring batches of milk from said milk receiving means to said milk reservoir through said conduit; and a milk filter connected with said milk reservoir outlet.

2. The milk handling system of claim 1 wherein said milk filter has an inlet in said reservoir and an outlet connected with said reservoir outlet.

3. The milk handling system of claim 1 wherein said reservoir outlet is in a bottom portion of said reservoir, and said reservoir has a connection open to atmosphere in a top portion thereof.

4. In a milk handling system having an evacuated milk line and a milk storage means, a milk filtering arrangement, comprising: milk receiving means connected with said evacuated milk line, conduit means for transferring milk from said milk receiving means to said milk storage means; a milk reservoir in said conduit means, said milk reservoir having an outlet; intermittent milk transfer means connected with said conduit for transferring milk from said milk receiving means to said milk reservoir; and a milk filter connected with said milk reservoir outlet.

5. The milk filter arrangement of claim 4, wherein said conduit means has a substantially horizontal portion, and said milk reservoir is in said horizontal portion.

6. The milk filtering arrangement of claim 4, wherein said conduit means has a substantially vertical portion, and said milk reservoir is in said vertical portion.

7. In a milk handling system having an evacuated milk line and a milk storage means, a milk filtering arrangement, comprising; milk receiving means connected with said evacuated milk line; conduit means for transferring milk from said milk receiving means to said milk storage means; a milk reservoir in said conduit means, said milk reservoir having an outlet; an intermittently operating pump in said conduit means for transferring milk from said milk receiving means to said milk reservoir; and a milk filter connected with said milk reservoir outlet.

8. In a milk handling system having an evacuated milk line and milk storage means, a milk filtering arrangement, comprising: milk receiving means connected with said evacuated milk line; conduit means for transferring milk from said milk receiving means to said milk storage means; a milk reservoir in said conduit means, said milk reservoir having an outlet; an intermittently operating milk releaser in said conduit means for transferring milk from said milk receiving means to said milk reservoir; and a milk filter connected with said milk reservoir outlet.

9. In a milk handling system having an evacuated milk line and milk storage means, a milk filtering arrangement, comprising: milk receiving means connected with said evacuated milk line; a milk releaser for intermittently releasing milk from said milk receiving means; means for transferring milk released from said milk receiving means to said milk releaser; conduit means connecting said milk releaser and said milk storage means for transferring milk from said milk releasing means to said storage means, said conduit means acting as a reservoir for milk leaving said releaser; and a milk filter in said conduit means.

10. In a carry-away milking system having an evacuated milk line and a milk storage means, a milk filtering arrangement, comprising: milk receiving means connected with said evacuated milk line; conduit means for the passage of milk from said milk receiving means to said milk storage means; a milk reservoir in said conduit means, said milk reservoir having an outlet in a lower portion thereof and an opening to atmosphere in an upper portion thereof; intermittently operating means in said conduit means for transferring milk from said milk receiving means to said milk reservoir; and a milk filter having an inlet in said reservoir and an outlet connected with the outlet of said milk reservoir.

11. In a carry-away milking system having an evacuated milk line and milk storage means, a milk filtering arrangement, comprising: milk receiving means connected with said evacuated milk line; conduit means commencing at said milk receiving means and terminating at said milk storage means; a milk reservoir in said conduit means having an outlet in a lower portion thereof and an overflow opening in an upper portion thereof, an overflow signal device operatively associated with said overflow opening through an overflow channel having an exit end; means in said conduit means for intermittently transferring milk from said milk receiving means to said milk reservoir; and a milk filter in said means between said reservoir and said milk storage means.

12. The milk handling system of claim 1 wherein said milk reservoir is provided with an overflow connection.

13. The carry away milking system of claim 11 wherein said overflow signal device has an activator paddle positioned adjacent the exit end of said overflow channel for actuation by a stream of milk emerging from said overflow channel.

References Cited in the file of this patent

UNITED STATES PATENTS

| | | |
|---|---|---|
| 1,048,828 | Haas | Dec. 31, 1912 |
| 2,579,863 | Robinson | Dec. 25, 1951 |
| 2,616,809 | Graves | Nov. 4, 1952 |
| 2,730,992 | Kessler | Jan. 17, 1956 |
| 2,791,964 | Reeve | May 14, 1957 |
| 2,878,819 | Thomas | Mar. 24, 1959 |
| 2,982,247 | Varese et al. | May 2, 1961 |
| 3,044,443 | Baum | July 17, 1962 |